US009443390B2

(12) United States Patent
LeMay et al.

(10) Patent No.: US 9,443,390 B2
(45) Date of Patent: Sep. 13, 2016

(54) MANAGING VIRTUAL CURRENCIES IN A GAMING ENVIRONMENT

(71) Applicant: IGT, Reno, NV (US)

(72) Inventors: Steve G. LeMay, Reno, NV (US); Dwayne R. Nelson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 532 days.

(21) Appl. No.: 13/921,132

(22) Filed: Jun. 18, 2013

(65) Prior Publication Data

US 2014/0370969 A1 Dec. 18, 2014

(51) Int. Cl.
*G06F 17/00* (2006.01)
*G06F 19/00* (2011.01)
*G07F 17/32* (2006.01)

(52) U.S. Cl.
CPC ....... *G07F 17/3248* (2013.01); *G07F 17/3225* (2013.01); *G07F 17/3244* (2013.01); *G07F 17/3251* (2013.01)

(58) Field of Classification Search
CPC ........................ G07F 17/3244; G07F 17/3251
See application file for complete search history.

(56) References Cited

U.S. PATENT DOCUMENTS

| | | | |
|---|---|---|---|
| 4,033,588 | A | 7/1977 | Watts |
| 4,611,811 | A | 9/1986 | Haase |
| 4,661,906 | A | 4/1987 | DiFrancesco et al. |
| 4,711,454 | A | 12/1987 | Small |
| 4,747,600 | A | 5/1988 | Richardson |
| 4,775,155 | A | 10/1988 | Lees |
| 4,798,387 | A | 1/1989 | Richardson |
| 4,875,686 | A | 10/1989 | Timms |
| 5,005,840 | A | 4/1991 | Schwartz |
| 5,043,887 | A | 8/1991 | Richardson |
| 5,046,737 | A | 9/1991 | Fienberg |
| 5,072,381 | A | 12/1991 | Richardson et al. |
| 5,100,139 | A | 3/1992 | Di Bella |
| 5,116,049 | A | 5/1992 | Sludikoff et al. |
| 5,158,293 | A | 10/1992 | Mullins |
| 5,351,970 | A | 10/1994 | Fioretti |
| 5,401,024 | A | 3/1995 | Simunek |
| 5,419,592 | A | 5/1995 | Stuart |
| 5,482,289 | A | 1/1996 | Weingardt |
| 5,569,083 | A | 10/1996 | Fioretti |
| 5,586,937 | A | 12/1996 | Menashe |
| 5,639,089 | A | 6/1997 | Matsumoto et al. |
| 5,647,798 | A | 7/1997 | Falciglia |
| 5,651,735 | A | 7/1997 | Baba |
| 5,679,077 | A | 10/1997 | Pocock et al. |
| 5,687,971 | A | 11/1997 | Khaladkar |
| 5,718,631 | A | 2/1998 | Invencion |
| 5,727,786 | A | 3/1998 | Weingardt |
| 5,743,526 | A | 4/1998 | Inoue |
| 5,755,619 | A | 5/1998 | Matsumoto et al. |
| 5,779,545 | A | 7/1998 | Berg et al. |
| 5,813,911 | A | 9/1998 | Margolin |
| 5,823,534 | A | 10/1998 | Banyai |

(Continued)

*Primary Examiner* — Steven J Hylinski
(74) *Attorney, Agent, or Firm* — Neal, Gerber & Eisenberg LLP

(57) ABSTRACT

A method for converting a game award earned during play of a first wager-based game into a game award in a second wager-based game includes, but is not limited to any of combination of: receiving, over a network, a request to convert a first award earned by a player in the first wager-based game into at least one award in the second wager-based game; converting, by one or more processors, the first award earned during play of the first wager-based game to at least one award associated with the second wager-based game based on award conversation data; and storing, by the one or more processors, data associated with result of the conversion of the first award into the at least award of the second wager-based game in a data storage system.

20 Claims, 9 Drawing Sheets

(56) References Cited

U.S. PATENT DOCUMENTS

| | | | |
|---|---|---|---|
| 5,857,911 | A | 1/1999 | Fioretti |
| 5,871,398 | A | 2/1999 | Schneier et al. |
| 5,909,875 | A | 6/1999 | Weingardt |
| 5,935,001 | A | 8/1999 | Baba |
| 5,935,002 | A | 8/1999 | Falciglia |
| 5,945,655 | A | 8/1999 | Gilgeous et al. |
| 6,017,032 | A | 1/2000 | Grippo et al. |
| 6,024,640 | A | 2/2000 | Walker et al. |
| 6,079,711 | A | 6/2000 | Wei et al. |
| 6,099,407 | A | 8/2000 | Parker et al. |
| 6,102,400 | A | 8/2000 | Scott et al. |
| 6,146,272 | A | 11/2000 | Walker et al. |
| 6,168,521 | B1 | 1/2001 | Luciano et al. |
| 6,183,361 | B1 | 2/2001 | Cummings et al. |
| 6,210,276 | B1 | 4/2001 | Mullins |
| 6,220,961 | B1 | 4/2001 | Keane et al. |
| 6,241,606 | B1 | 6/2001 | Riendeau et al. |
| 6,250,685 | B1 | 6/2001 | Walker et al. |
| 6,257,980 | B1 | 7/2001 | Santini, Jr. |
| 6,315,290 | B1 | 11/2001 | Roethel et al. |
| 6,315,291 | B1 | 11/2001 | Moody |
| 6,325,716 | B1 | 12/2001 | Walker et al. |
| 6,358,151 | B1 | 3/2002 | Enzminger et al. |
| 6,364,313 | B1 | 4/2002 | Moody |
| 6,368,213 | B1 | 4/2002 | McNabola |
| 6,368,214 | B1 | 4/2002 | Luciano |
| 6,398,644 | B1 | 6/2002 | Perrie et al. |
| 6,398,646 | B1 | 6/2002 | Wei et al. |
| 6,402,614 | B1 | 6/2002 | Schneier et al. |
| 6,425,823 | B1 | 7/2002 | Byrne |
| 6,478,677 | B1 | 11/2002 | Moody |
| 6,482,088 | B2 | 11/2002 | Santini, Jr. |
| 6,514,144 | B2 | 2/2003 | Riendeau et al. |
| 6,524,184 | B1 | 2/2003 | Lind et al. |
| 6,524,185 | B2 | 2/2003 | Lind |
| 6,533,660 | B2 | 3/2003 | Seelig et al. |
| 6,565,091 | B2 | 5/2003 | Weingardt |
| 6,569,017 | B2 | 5/2003 | Enzminger et al. |
| 6,581,935 | B1 | 6/2003 | Odom |
| 6,585,590 | B2 | 7/2003 | Malone |
| 6,599,188 | B2 | 7/2003 | Hirsch et al. |
| 6,607,440 | B2 | 8/2003 | Santini, Jr. |
| 6,609,973 | B1 | 8/2003 | Weiss |
| 6,645,072 | B1 | 11/2003 | Kellen |
| 6,656,044 | B1 | 12/2003 | Lewis |
| 6,656,045 | B2 | 12/2003 | Wei et al. |
| 6,722,655 | B1 | 4/2004 | Camero |
| 6,755,738 | B2 | 6/2004 | Glasson et al. |
| 6,755,739 | B2 | 6/2004 | Santini, Jr. |
| 6,780,108 | B1 | 8/2004 | Luciano et al. |
| 6,802,776 | B2 | 10/2004 | Lind et al. |
| 6,824,465 | B2 | 11/2004 | Luciano, Jr. |
| 6,832,956 | B1 | 12/2004 | Boyd et al. |
| 6,840,858 | B2 | 1/2005 | Adams |
| 7,258,608 | B2 | 8/2007 | Khal |
| 7,303,469 | B2 | 12/2007 | Kaminkow |
| 7,306,519 | B2 | 12/2007 | Baerlocher |
| 7,399,227 | B2 | 7/2008 | Michaelson et al. |
| 7,544,129 | B2 | 6/2009 | Baerlocher |
| 7,682,241 | B2 | 3/2010 | Baerlocher |
| 7,824,257 | B2 | 11/2010 | Jubinville et al. |
| 7,901,282 | B2 | 3/2011 | Cannon |
| 8,025,561 | B2 | 9/2011 | Reddicks et al. |
| 9,087,437 | B2 * | 7/2015 | Kroeckel ............ G07F 17/3295 |
| 2002/0045472 | A1 | 4/2002 | Adams |
| 2002/0052231 | A1 | 5/2002 | Fioretti |
| 2002/0094859 | A1 | 7/2002 | Hirsch et al. |
| 2002/0094871 | A1 * | 7/2002 | Luciano, Jr. ............ G07F 17/32 463/43 |
| 2002/0098883 | A1 | 7/2002 | Packes et al. |
| 2002/0111207 | A1 | 8/2002 | Lind et al. |
| 2002/0111214 | A1 | 8/2002 | Lind et al. |
| 2002/0113369 | A1 | 8/2002 | Weingardt |
| 2002/0117803 | A1 | 8/2002 | Weingardt |
| 2002/0137562 | A1 | 9/2002 | Malone |
| 2002/0155877 | A1 | 10/2002 | Enzminger et al. |
| 2002/0160833 | A1 * | 10/2002 | Lloyd ..................... A63F 13/10 463/29 |
| 2002/0169018 | A1 | 11/2002 | Schneier et al. |
| 2002/0177478 | A1 | 11/2002 | Glasson et al. |
| 2003/0017867 | A1 | 1/2003 | DeKeller |
| 2003/0127793 | A1 | 7/2003 | Adams |
| 2003/0144050 | A1 | 7/2003 | Keaton et al. |
| 2003/0171986 | A1 | 9/2003 | Itkis et al. |
| 2003/0178771 | A1 | 9/2003 | Banyai |
| 2003/0181234 | A1 | 9/2003 | Falciglia, Sr. |
| 2003/0193136 | A1 | 10/2003 | Walker et al. |
| 2003/0195032 | A1 | 10/2003 | Enzminger et al. |
| 2004/0009806 | A1 | 1/2004 | Odom |
| 2004/0048647 | A1 | 3/2004 | Lind et al. |
| 2004/0053669 | A1 | 3/2004 | Gerrard et al. |
| 2004/0106445 | A1 | 6/2004 | Perrie et al. |
| 2004/0121834 | A1 | 6/2004 | Libby et al. |
| 2004/0130096 | A1 | 7/2004 | Duhamel |
| 2004/0152499 | A1 | 8/2004 | Lind et al. |
| 2004/0166920 | A1 | 8/2004 | Boyd et al. |
| 2004/0176169 | A1 | 9/2004 | Lind et al. |
| 2004/0178579 | A1 | 9/2004 | Lowell et al. |
| 2004/0204225 | A1 | 10/2004 | Campo et al. |
| 2004/0214626 | A1 | 10/2004 | Lind et al. |
| 2004/0235555 | A1 | 11/2004 | Yarbrough et al. |
| 2004/0242310 | A1 | 12/2004 | Perkins |
| 2004/0251628 | A1 | 12/2004 | Kilby |
| 2004/0266509 | A1 | 12/2004 | Bennett et al. |
| 2005/0054404 | A1 | 3/2005 | Baerlocher |
| 2005/0054415 | A1 | 3/2005 | Kaminkow et al. |
| 2005/0059449 | A1 | 3/2005 | Yarbrough |
| 2005/0059467 | A1 | 3/2005 | Saffari et al. |
| 2005/0059468 | A1 | 3/2005 | Cannon |
| 2005/0059469 | A1 | 3/2005 | Gail et al. |
| 2005/0059470 | A1 | 3/2005 | Cannon |
| 2005/0059471 | A1 | 3/2005 | Cannon |
| 2005/0064932 | A1 | 3/2005 | Cannon |
| 2005/0075161 | A1 | 4/2005 | McGlone et al. |
| 2005/0096119 | A1 | 5/2005 | Lind et al. |
| 2005/0096123 | A1 | 5/2005 | Cregan et al. |
| 2005/0101370 | A1 | 5/2005 | Lind et al. |
| 2005/0101387 | A1 | 5/2005 | Wolf |
| 2005/0119042 | A1 | 6/2005 | Chamberlain et al. |
| 2005/0130730 | A1 | 6/2005 | Lind et al. |
| 2005/0148382 | A1 | 7/2005 | Fox |
| 2005/0164771 | A1 | 7/2005 | Lind et al. |
| 2005/0164772 | A1 | 7/2005 | Lind et al. |
| 2005/0164773 | A1 | 7/2005 | Lind et al. |
| 2005/0167916 | A1 | 8/2005 | Banyai |
| 2005/0187014 | A1 | 8/2005 | Saffari et al. |
| 2005/0227753 | A1 | 10/2005 | Luciano, Jr. |
| 2005/0255906 | A1 | 11/2005 | Lind et al. |
| 2005/0282624 | A1 * | 12/2005 | Kane ....................... A63F 13/12 463/25 |
| 2006/0084490 | A1 | 4/2006 | Khal |
| 2006/0189375 | A1 | 8/2006 | Dodge |
| 2007/0021185 | A1 | 1/2007 | Walker et al. |
| 2007/0117611 | A1 | 5/2007 | Dodge |
| 2008/0102952 | A1 | 5/2008 | Walker et al. |
| 2008/0167118 | A1 * | 7/2008 | Kroeckel ................ G07F 17/32 463/1 |
| 2008/0254894 | A1 | 10/2008 | Michaelson et al. |
| 2009/0075715 | A1 | 3/2009 | Coleman et al. |
| 2009/0197664 | A1 | 8/2009 | Schultz |
| 2010/0120489 | A1 | 5/2010 | Meyer |
| 2011/0028201 | A1 | 2/2011 | Warner et al. |
| 2011/0045896 | A1 * | 2/2011 | Sak ..................... G07F 17/3244 463/25 |
| 2012/0209770 | A1 * | 8/2012 | Peruvemba ............ G06Q 30/06 705/44 |
| 2012/0244950 | A1 * | 9/2012 | Braun ..................... A63F 13/10 463/42 |
| 2013/0065674 | A1 * | 3/2013 | Luciano, Jr. ............ G07F 17/32 463/25 |

* cited by examiner

Game 404

416 418 420

| Item | Virtual Currency |
|---|---|
| Custom Car Slot Symbols | 25 |
| Ferrari Avatar | 75 |
| Fancy Wheels | 20 |
| Garage for Car | 25 |
| Custom Paint Job | 15 |

MANAGING VIRTUAL CURRENCIES IN A GAMING ENVIRONMENT

BACKGROUND

The present disclosure relates generally to wager-based games and more particularly to awarding awards during game plays. Games can be played in gaming casinos and other locations that feature different single and multi-player gaming machines (e.g., slot machines, keno, video poker, etc.). The gaming machines may include a number of hardware and software components to provide a wide variety of game types and game playing capabilities. Online game services enable players to play a variety of games from their user devices. Players may earn achievements or receive other awards such as avatars during game play.

SUMMARY

A method for converting a game award earned during play of a first wager-based game into a game award in a second wager-based game includes, but is not limited to any of combination of: receiving, over a network, a request to convert a first award earned by a player in the first wager-based game into at least one award in the second wager-based game; converting, by one or more processors, the first award earned during play of the first wager-based game to at least one award associated with the second wager-based game based on award conversation data; and storing, by the one or more processors, data associated with result of the conversion of the first award into the at least award of the second wager-based game in a data storage system.

An electronic device for playing one or more games including a display configured to display a first wager-based game to a player, a user-input panel, and a game controller having one or more data processors and one or more storage devices storing instructions. When the instructions are executed by the one or more data processors, cause the one or more data processors to perform operations comprising: receiving player account login information from a user interface, wherein the player account login information is associated with a player; authenticating the player account login information; displaying the first wager-based game including one or more awards earned by the player in other games; receiving a request from the player to convert a second award previously earned by the player during play of a second wager-based game into a first award in the first wager-based game; transmitting the request to convert the second wager-based game award to a player management system; and receiving data associated with result of the requested award conversion from the player management system.

A computer-readable storage medium having machine instructions stored therein. The instructions being executable by a processor to cause the processor to perform operations comprising: receiving, over a network, a request to convert a first award earned by a player in a first wager-based game into at least one award in a second wager-based game; converting the first award earned during play of the first wager-based game to at least one award associated with the second wager-based game based on award conversation data; and storing data associated with result of the conversion of the first award into the at least award of the second wager-based game in a data storage system.

These implementations are mentioned not to limit or define the scope of the disclosure, but to provide an example of an implementation of the disclosure to aid in understanding thereof. Particular implementations may be developed to realize one or more of the following advantages.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

Figure 1:
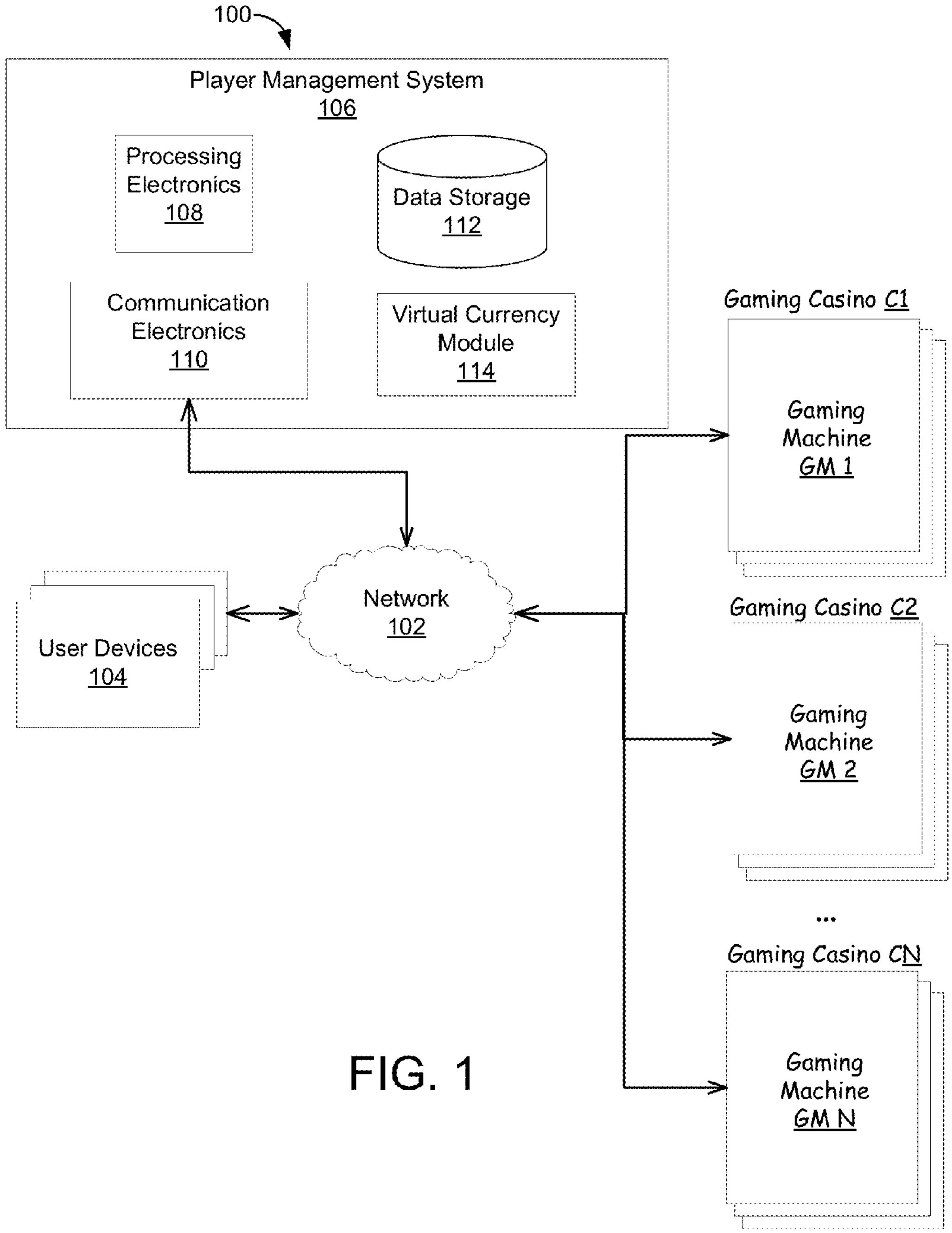
FIG. 1 is a block diagram of an environment enabling users to play games in various gaming environments, in accordance with an example implementation.

Numerous specific details may be set forth below to provide a thorough understanding of concepts underlying the described embodiments. It may be apparent, however, to one skilled in the art that the described embodiments may be practiced without some or all of these specific details. In other instances, some process steps have not been described in detail in order to avoid unnecessarily obscuring the underlying concept.

According to various embodiments disclosed herein, a player may convert awards earned during play of a game into awards in other games and/or into virtual currency that can be used by the player. For example, a game theme or an entire game may be retired and the player may not be able to play this game in the future. In this example, the player may be at risk of losing the awards already earned in that game. In another example, the player may voluntarily wish to stop playing a particular game (e.g., the player may grow tired of the game). Allowing the player to convert earned game awards from one game into game awards in another game or into virtual currency advantageously enables the player to preserve some or all of the value of the awards earned in the first game. As a result, player satisfaction is improved because the player feels that the time and money that went into winning awards in that game are preserved.

When a new game is introduced, enabling the player to purchase awards in that game with the virtual currency accumulated by the player or directly with awards earned in other games may incentivize the player to try the new game.

Thus, player satisfaction is increased, and the player is more likely to remain loyal to the games offered by the game provider.

A game, as referred herein, may be a wager-based game, a free game, or a combination of the two. The game may be played at brick and mortar casinos and/or in an online environment (e.g., online casino). For example, the player may play a game on a gaming machine at a casino. In another example, using a computing device such as a mobile phone, the player may log into their player account on a website associated with an online casino or an online gaming provider, and resume playing a game or begin playing a new game. As used herein, the awards that the player may earn during game play may include avatars, game customizations, avatar customizations, animations, pictures, additional game plays, etc.

A player account may be associated with each player playing games offered by the game provider. For example, to play hosted and communal games, a player may log into their player account by providing authentication information (e.g., password, player tracking card information, etc.). Once logged into the player account, the player may be encouraged to play through features such as chatting, questing, tournaments, awards, etc. The player account may also be used to track and manage awards accumulated by the player. Player account data associated with each player account may include virtual currency data (e.g., total amount of virtual currency accumulated by the player). For example, the virtual currency available to the player may include virtual currency that was converted from awards earned in multiple games. The virtual currency can be used to purchase various game related items including, but not limited to, game plays and game awards.

In some embodiments, using the data associated with the player account, awards earned by the player in a game may be converted into awards in one or more other games. For example, the player may accumulate awards (e.g., customizations to an avatar) in a first game played at a casino gaming machine. The player may wish to convert some or all of the awards earned or purchased during the first game and convert them to awards in one or more other games.

The virtual currency may be used to facilitate conversions of game awards. For example, a player may trade in an avatar won while playing a first game in a casino for fifty points of virtual currency. Those virtual currency points may be used by the player on their mobile device for online play of the same or different game. In another example, those fifty points may be used for purchasing another gaming item (e.g., an avatar) or for some other system loyalty feature (e.g., a customized ring on their phone) in the same game or a different game, and in the same or different gaming environment. Accordingly, the virtual currency accumulated by the player may be used by the player in various gaming platforms and channels (e.g., casino, free play, online, wager play, etc).

In some embodiments, the player may be presented with meaningful descriptions of virtual currency instead of actual point values. The representations and exchange rates between game awards and virtual currency may be described and managed by the game and host system (e.g., a player management system or another system). As a result, these exchange rates may not be displayed to the player. For example, a first game might represent 100 points as twenty gold crowns, while the same 100 points might be represented by fifty diamond rings in a second game. In this example, the player is not presented with information regarding 100 points, but rather shown the gold crowns or other game related items. In other embodiments, the exchange rates between game awards and virtual currency may be displayed to the user.

The player may be provided with the total amount of virtual currency available to the player and/or specific gaming items for which the player can convert the virtual currency in the game currently played or another game available for play to the player. In some embodiments, the virtual currency or points may be converted to real currency or other items of value. For example, the virtual currencies could be converted to cash airline travel points, restaurant vouchers, and so on. In some embodiments, the value of game awards or other acquired game items can change over time based on player activity, player wager, averages of player activity, averages of player wagers over time (e.g., in the past month), or any combination thereof.

FIG. 1 illustrates an environment 100 in which a plurality of user devices 104 and a plurality of gaming machines GM 1, GM 2 through GM N are connected to a player management system 106 over a network 102. Game players may utilize user devices 104 and/or gaming machines GM 1, GM 2, through GM N at gaming casinos to play various games. A user device 104 is an electronic device that is under the control of a player.

The gaming machines GM 1, GM 2 through GM N are located at gaming casinos C1, C2 through CN, respectively. Each gaming casino can have any number of gaming machines (e.g., tens, hundreds, thousands or more). The gaming machines can be any type of gaming machines (e.g., slot machines, keno gaming machines, etc.). The gaming machines GM 1, GM 2, through GM N can communicate with the player management system 106 over the network 102.

The player account management system 106 can maintain player account data for a plurality of players associated with one or more game providers. The player account data may include personal player information, player's historical gaming data, virtual currency data and/or awards data about game awards achieved or purchased by game players. A data storage 112 of the player management system 106 can store the player account data. The data storage 112 may include one or more electronic storage devices capable of storing electronic data, such as, but not limited to, a computer hard drive, disk drive, or other suitable data storage device.

The player management system 106 can include any suitable processing and communication electronics capable of communication over the network 102, such as a local area network (e.g., using Ethernet computer networking technologies), a wide area network (WAN), a wireless network (e.g., using a Bluetooth wireless technology), the Internet, or a combination thereof. The player management system 106 includes communication electronics 110 and processing electronics 108. The communication electronics 110 may receive data regarding game items and/or virtual currency earned by players. For example, the received data may indicate that a first player earned certain awards while playing a first game. In this example, the communication electronics 110 in turn may send the received data to the processing electronics 108 for further processing. The processing electronics 108 may update the account information stored in the data storage 112 with the received data.

As shown, the player management system 106 includes a virtual currency module 114. The virtual currency module 114 may process data related to conversion of game awards and other gaming items between games, and/or conversion of game awards into a virtual currency and conversion of virtual currency into game awards. The virtual currency module 114 may maintain award conversion data specifying what each award or achievement in a game is worth in terms of virtual currency value and/or in relation to other games. For example, each game award may be assigned a particular virtual currency value. The virtual currency values for each game award may be intermittently updated by an administrator of the player management system 106 and/or automatically by the player management system 106 or another system.

The award conversion data may be stored in the data storage 112 or another data storage accessible to the virtual currency module 114. In some embodiments, the virtual currency module 114 may be implemented in another system separate from the player management system 106. In other embodiments, a gaming application installed on each gaming machine and/or user device may include the virtual currency module 114.

For example, a first player may play a game on a gaming machine GM 1 located in the gaming casino C1. The first player can log into the system and access account information for the first player's account by entering account authentication information. Once logged into the player account, the player may play a first game on the gaming machine GM 1 and earn various awards and other game items. Data about the awards earned by the first player during play of the first game may be transmitted to the player management system 106 and stored in the data storage 112. The player may then play a second game using another gaming machine at the same casino or at a different casino. The data regarding the awards earned during the play of the first game (and other games played by the player) may be retrieved by the gaming machine from the player management system 106 and displayed to the player during play of the second game.

In this example, the player may be allowed to exchange some or all of the awards earned during play of the first game and other games into awards in the second game. When the player chooses to convert awards earned in other games into awards or other game item in the second game, the award conversion request may be transmitted to the player management system 106 and processed by the virtual currency module 114. Using the award conversion data, the virtual currency module 114 may convert the first award earned by the player during play of the first game into a second award in another game. The result of the award conversion may be stored in the data storage 112 or another data storage and communicated back to the gaming machine on which the player is playing the second game.

Game players may utilize user devices to play various games. The player may convert awards earned during game play on casino gaming machines into awards for a game played on a user device 104. User devices 104 can be any suitable network communication devices capable of communicating over the electronic communication network 102. Each user device 104 may include a mobile phone, a video game console, a desktop computer, a laptop computer, an electronic pad or the like, programmed or otherwise configured to perform the operations described herein. Each user device 104 may include a display device that is configured to display user-perceptible information to a user. Each user device 104 may also include one or more user input devices (such as, but not limited to, touch screen, buttons, knobs or the like) to allow a user to input information. In some implementations, the user devices 104 may include a user application, such as a web browser, to facilitate the sending and receiving of data over the network 102.

Figure 2A:
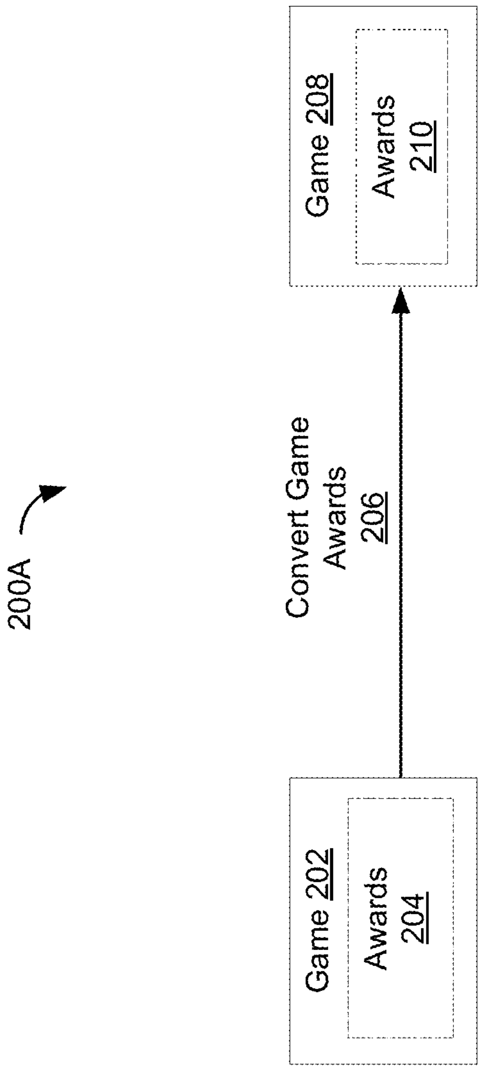
FIGS. 2A-B are block diagrams illustrating transferring game awards between games, in accordance with an example implementation.

Referring now to FIG. 2A, a block diagram 200A illustrating conversion of game awards acquired by a player in a first game into game awards in a second game is shown, according to an exemplary embodiment. The block diagram 200A displays two games 202 and 208. In some embodiments, the games 202 and 208 are played by the player in the same gaming environment. For example, the games 202 and 208 are played at the same casino. In this example, the player may use the awards earned during the play of the game 202 to purchase awards in the game 208. In another example, both of the gaming environments of the games 202 and 208 may be online gaming environments. The games 202 and 208 may be played by players in different gaming environments. For example, the gaming environment in which the game 202 is played may be a gaming casino (e.g., gaming casino C1), while the gaming environment in which the game 208 is played may be an online gaming environment. The games 202 and 208 may also be played in different casinos.

While playing the game 202, the player may earn awards 204. The player may wish to convert the awards earned during playing of the game 202 to awards in another game. For example, the game 202 may be discontinued and the player may be at risk of losing the awards earned during play of the game 202. Allowing the player to convert the awards earned in one game into virtual currency and/or directly into awards or awards in other games advantageously preserves the value of the player's game awards.

As shown, the awards acquired during the game 202 are directly converted (206) into awards in the game 208. This conversion may be requested by the player or performed automatically by the virtual currency management module 114, or another system, or application. The player management system 106, another system, or the gaming device or machine used by the player may store or have access to award conversion data that specifies value of the awards of various games. Using this conversion data, the awards 204 earned during the game 202 may be converted into awards 210 in game 208. The conversion rates in the conversion data may vary over time. In some embodiments, the conversion may be based on payback calculated according to paytable, total amount played by the player, amount wagered, averages of these indicators over time, and/or any combination of thereof.

Figure 2B:
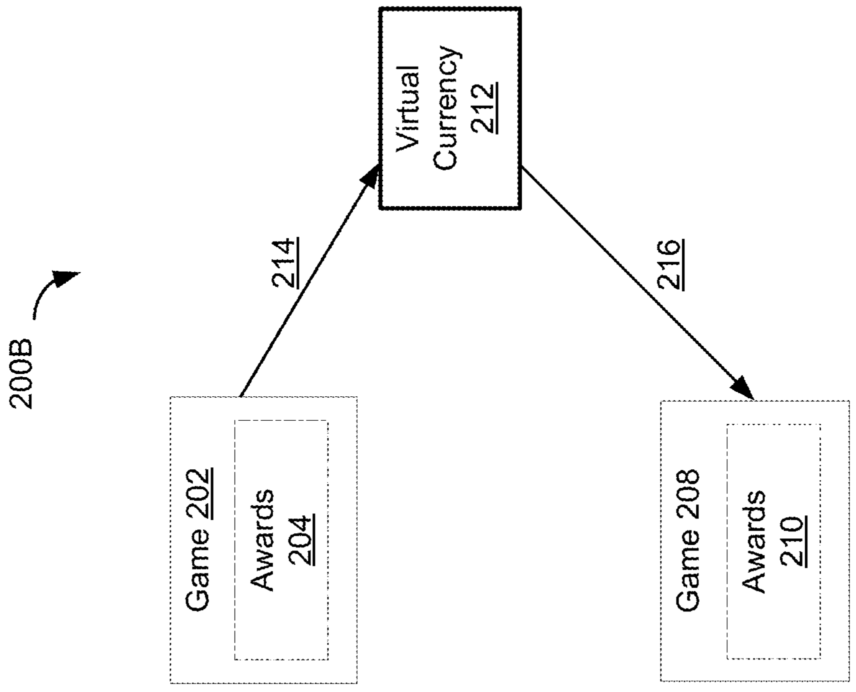

Referring now to FIG. 2B, a block diagram 200B illustrating conversion of game awards earned by a player in a first game into virtual currency, and then conversion of the virtual currency into awards in another game is shown, according to an exemplary embodiment. A player of the game 202 earns or purchases awards 204. The player may convert the awards 204 into a certain amount of virtual currency 212. The amount of virtual currency 214 may be determined using conversion data that specifies the conversion between achievement items and virtual currency amounts. The virtual currency 212 may then in turn be converted into awards 210 in another game 208.

Although FIG. 2B displays a single game 202 from which the player converts awards into virtual currency, the player can play any number of games from which the player can convert earned or purchased awards or awards into virtual currency. Although FIG. 2B displays a single game 208 in which the player purchases awards 210 using the virtual currency 212, the player can convert accumulated virtual currency 212 into awards in any number of games. For example, the player may convert 2,000 accumulated virtual currency points into awards in three games. In some embodiments, the player may be suggested specific awards in various games that can be purchased with the virtual currency available to the player.

Figure 3:
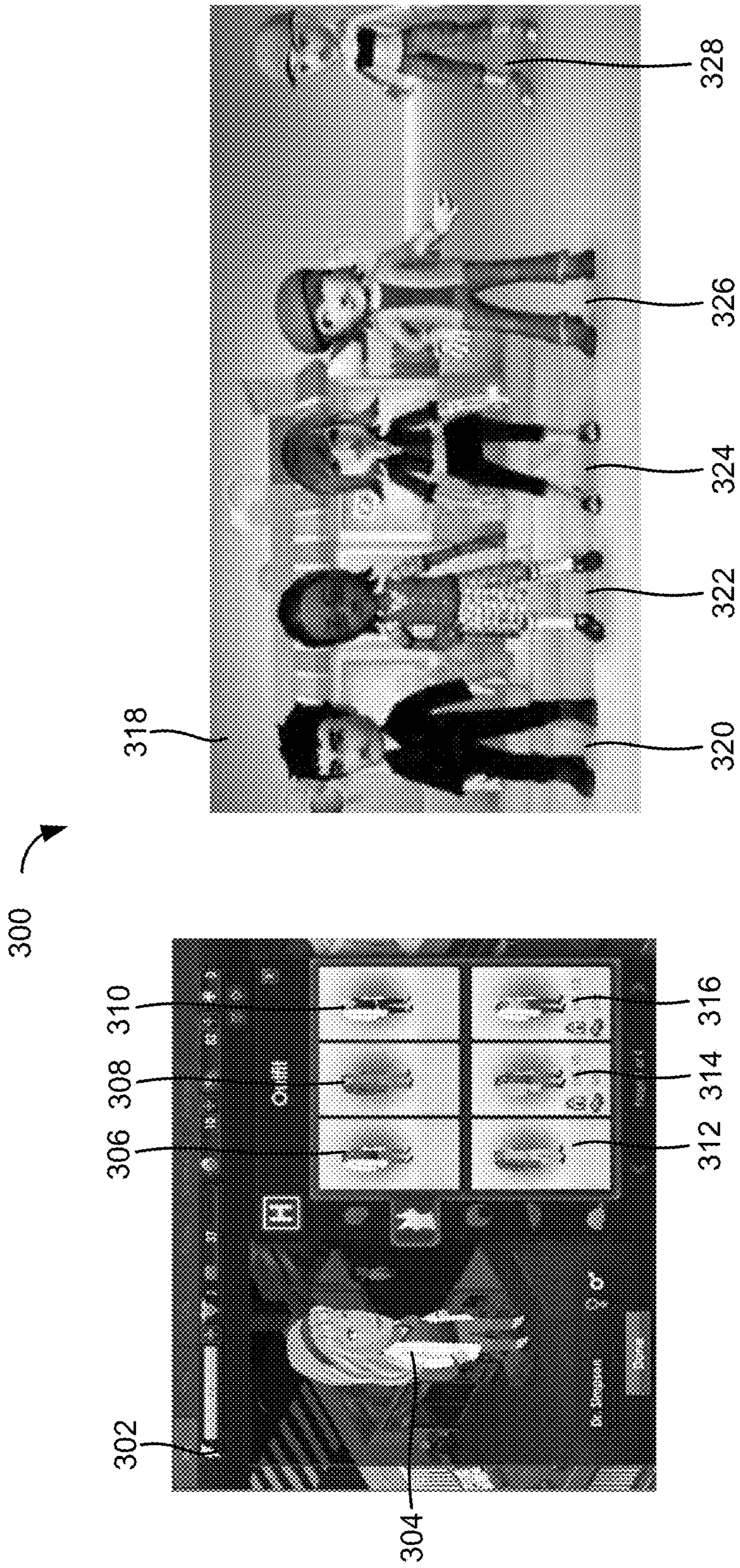
FIG. 3 is an illustration of user interfaces displaying available game awards, in accordance with an example implementation.

FIG. 3 illustrates awards that may be received by a player during game play and converted to other awards when a game theme is retired from the game. When the player hits certain game events (e.g., a royal flush in poker, triggers a special bonus, etc.), one or more awards may be awarded. The achievement may be tied to a particular game customization of multimedia content. As shown in FIG. 3, the achievement is tied to customization of an avatar 304. The avatar 304 is a female character avatar, and hitting a certain game event during game play may allow the player to choose one or more avatar outfits from available avatar outfits 306-316.

If the player becomes tired of the customization of the avatar, for example, the player may be allowed to convert the 304 avatar and/or the customization of the avatar into another item. As shown, in FIG. 3, the player may choose a new avatar from the avatars 320-328. As a result, the player may be able to exchange an avatar or one or more avatar customizations into another avatar in the same game. In other embodiments, the player may be able to exchange an avatar or avatar customization earned in a first game into another achievement in a different game.

Figure 4A:
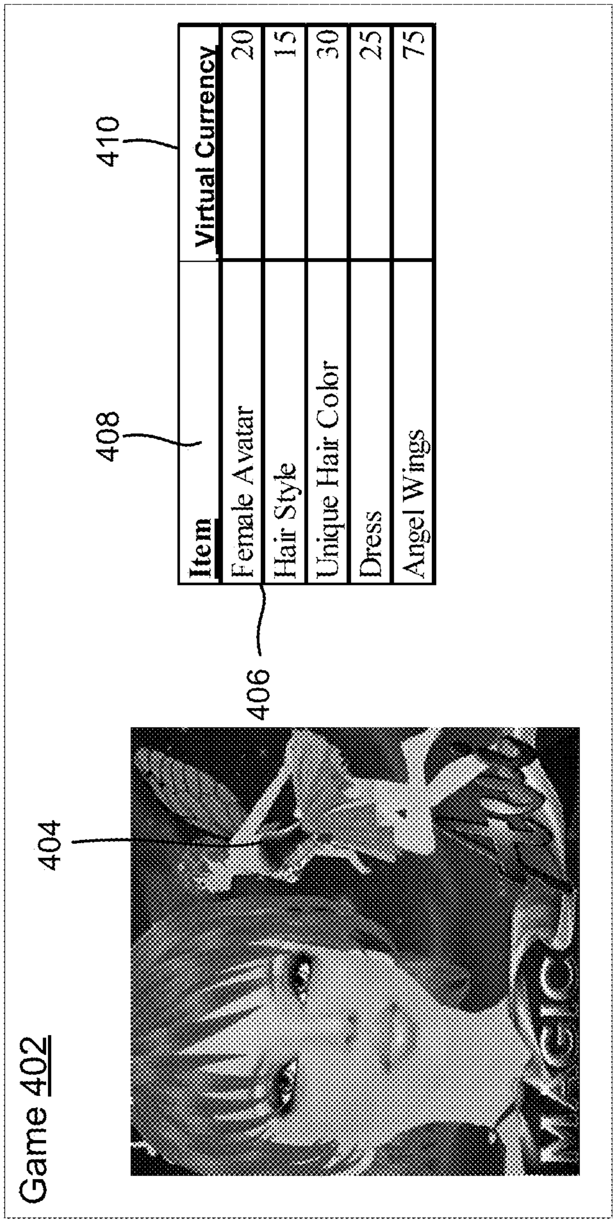
FIG. 4A-B is an illustration of user interfaces displaying available game awards and conversion tables between awards and virtual currency, in accordance with an example implementation.

FIG. 4A illustrates an exemplary illustration of a game 402 in which an avatar 404 is customized. Each available customization item is shown in a customization table 406. A column 408 of the customization table 404 specifies customization items, while a column 410 of the customization table 404 identifies the cost of each item in virtual currency. As shown, the female avatar is worth twenty points, hair style for the female avatar is worth fifteen points, unique hair color is worth thirty points, a dress is worth twenty five points, and angel wings are worth seventy five points. In some embodiments, the customization table 405 specifies the amount of virtual currency that the player can receive for each item. In other embodiments, the customization table 405 specifies the amount of virtual currency the player needs to pay to purchase the various items. In some embodiments, the customization table 405 is managed by the virtual currency management module 114 (or another module or system) and is not visible to the player. In these embodiments, the player may be provided with meaningful descriptions of the accumulated virtual currency.

Figure 4B:
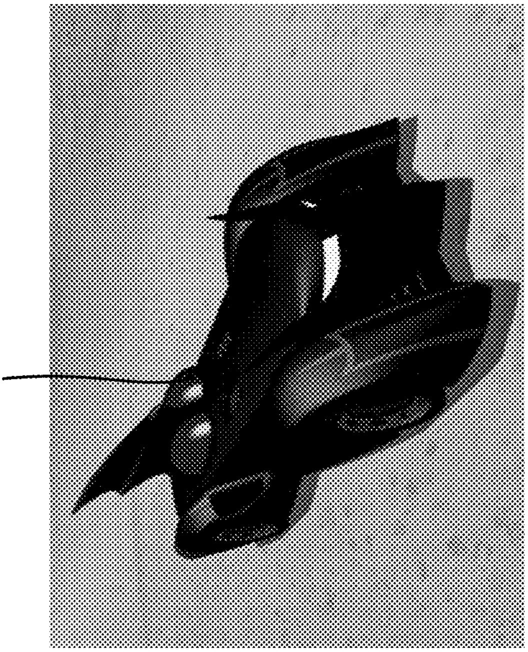

FIG. 4B also illustrates a customization table 416 in a car themed game 404 for customization of a car avatar 414. The customization table 416 may specify the cost of each customization item. For example, as shown, custom car slot symbols are worth twenty five points. In some embodiments, the customization table 416 is managed by the virtual currency management module 114 (or another module or system) and is not visible to the player. In these embodiments, the player may be provided with meaningful descriptions of the accumulated virtual currency.

While playing the game 402, the player may convert the female avatar's 404 hair style into fifteen points. Then, while playing the game 404, the player may use these fifteen points to purchase the custom paint job customization item. Accordingly, the player may convert some or all of awards earned during play of the game 402 into virtual currency, and then use this virtual currency to purchase awards or awards in other games, and/or other awards or awards in the same or a different game.

Figure 5:
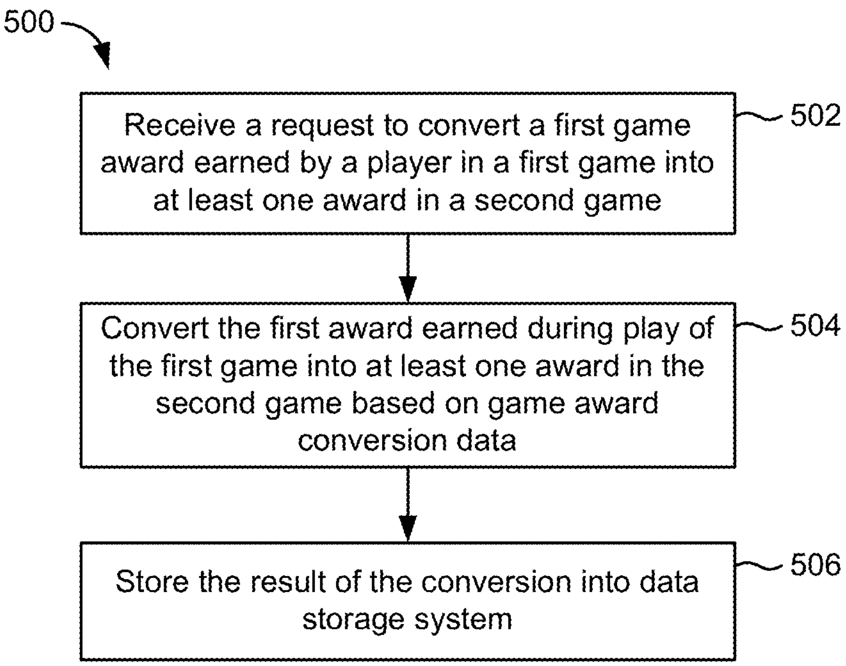
FIG. 5 is a flow diagram of a process for processing a request to convert an award earned during a game into an award in another game, in accordance with an example implementation.

FIG. 5 is a flow diagram of a process 500 for converting game awards into awards in another game, in accordance with an illustrative implementation. The process 500 can be implemented on a computing system (e.g., the player account management system 106). In one embodiment, the process 500 is encoded on a computer-readable medium that contains instructions that, when executed by the user device, cause the user device to perform operations of the process 500.

The process 500 includes receiving (step 502) a request to convert a first award, earned by a player while playing a first game, into a least one award in a second game. The first award may be an award to the player for achieving a certain level of play. In another example, the first award may be a bonus paid to the player. In another example, the player may have purchased the first award in the first game with virtual currency or real currency. The player may have played the first game at a casino, or in an online gaming environment using a user device 104. The first game may be a wager-based game or a free play game.

In some embodiments, the request for conversion may be generated automatically by the virtual currency management module 114, a gaming machine, a user device, or another computing device or system. For example, upon logging into a player account, it may be determined that a player has previously accumulated rewards in a game that has been discontinued, and that those awards need to be converted. In other embodiments, the request to convert the first award into at least one award in another game may be received from a user device 104 or a gaming machine at a casino. In these embodiments, the player may request that the first award gets converted into an award in a second game by selecting an option in a user interface of the second game (e.g., clicking on a link or button, touching an item on a touch screen display).

The process 500 further includes converting (step 504) the first award to at least one award in a second game based on award conversation data. The award conversion data may specify the amounts of virtual currency that the first award and the at least one award in the second game are worth. The award conversion data may be stored in the data storage 112 of the player management system 106, in local storage of a gaming machine or a user device that the player is using to play the first game. In some embodiments, the conversion data may be stored in a data storage that is accessible by the virtual currency management module 114, a gaming machine or a user device used by the player to play the first game.

The amount of virtual currency that the first award is worth according to the award conversion data may be the same or different than an amount of virtual currency that the first award is worth if it were to be purchased by a player. For example, the first award may be an avatar earned by the player during play of the first game. In this example, according to the award conversion data, the avatar may be worth 75 points of virtual currency. However, if the player was to purchase the same avatar with virtual currency, it may be more expensive to purchase the avatar (e.g., ninety five points of virtual currency).

The process 500 further includes storing (step 506) data associated with the result of the conversion of the first award into the at least one award in the second game into a data storage system. In some embodiments, the data storage system may store account information associated with the player. This account information may include information about all the games played by the player (e.g., including game state, awards received, etc.). The account information may store the amount of virtual currency that the player has accumulated thus far.

The data storage system may be the data storage 112 in the player management system 106 or another data storage in the virtual currency management module 114, or accessible by the virtual currency management module 114 or the gaming machines or user devices used by the player to play games.

Figure 6:
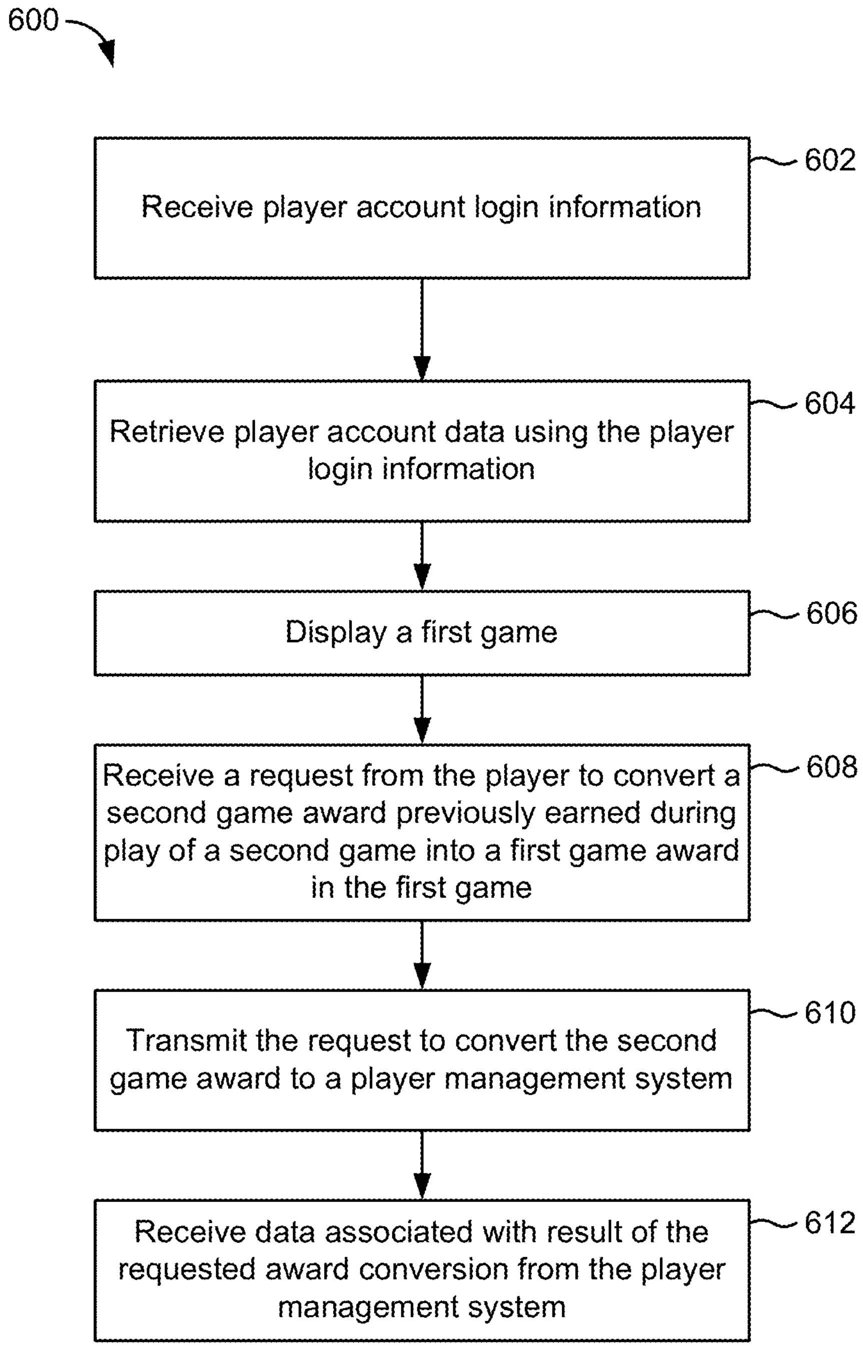
FIG. 6 is a flow diagram of a process for converting awards between games, in accordance with an example implementation.

FIG. 6 is a flow diagram of a process 600 for converting game awards between games, in accordance with an illustrative implementation. The process 600 can be implemented on a computing device (e.g., a gaming machine, a user device 104, etc.). In one embodiment, the process 600 is encoded on a computer-readable medium that contains instructions that, when executed by the computing device, cause the computing device to perform operations of the process 600.

The process 600 includes receiving (602) player account login information. The player may provide various player account login information including, but not limited to, login name, password, player tracking card information, etc. In some embodiments, the player may provide player account login information by providing a player card or another player identification card or voucher. The player account login information may be authenticated by transmitting the received player account login information to a hosted system (e.g., the player management system 106). The hosted system may compare the received player account login information to stored account information for the player.

At block 604, player account data is retrieved using the account login information. For example, a request may be transmitted to the host system for the player account data. The retrieved player account data may include virtual currency data associated with the player, and/or information about awards earned by the player in various games, etc. Some or all of this player account data may be displayed to the player on the display of a user device (e.g., mobile phone) or on a display of a gaming machine.

The process 600 further includes displaying (606) a first game to the player. For example, the visual components of the first game may be displayed to the player including the virtual currency information, and/or information about game awards previously earned in various games.

At block 608, a request is received to convert a second game award previously earned during play of a second game into a first game award in the first game. The user may manually select an option on the display that triggers the conversion of the second game award into an award (or multiple awards) in the first game. In some embodiments, the player is displayed the conversion rate between the first award and the second award (e.g., a female avatar in the second game is worth the same as a car avatar in the second game). In other embodiments, the player is not informed of the conversion rate.

The request to convert the second game award to a first award in a first game is transmitted (block 610) to a player management system (e.g., the system 106). Using award conversion data, the request to convert awards between two games is processed by the player management system 106. In particular, the virtual currency management module 114 may process the conversion request using award conversion data. Upon completion of processing of the award conversion, the data associated with the result of the award conversion is received (612) from the player management system 106. The results of the award conversion may displayed to the player in the first game. For example, the first award may be now displayed to the player in the first game. A history of award conversions may be available to the player for viewing.

Figure 7:
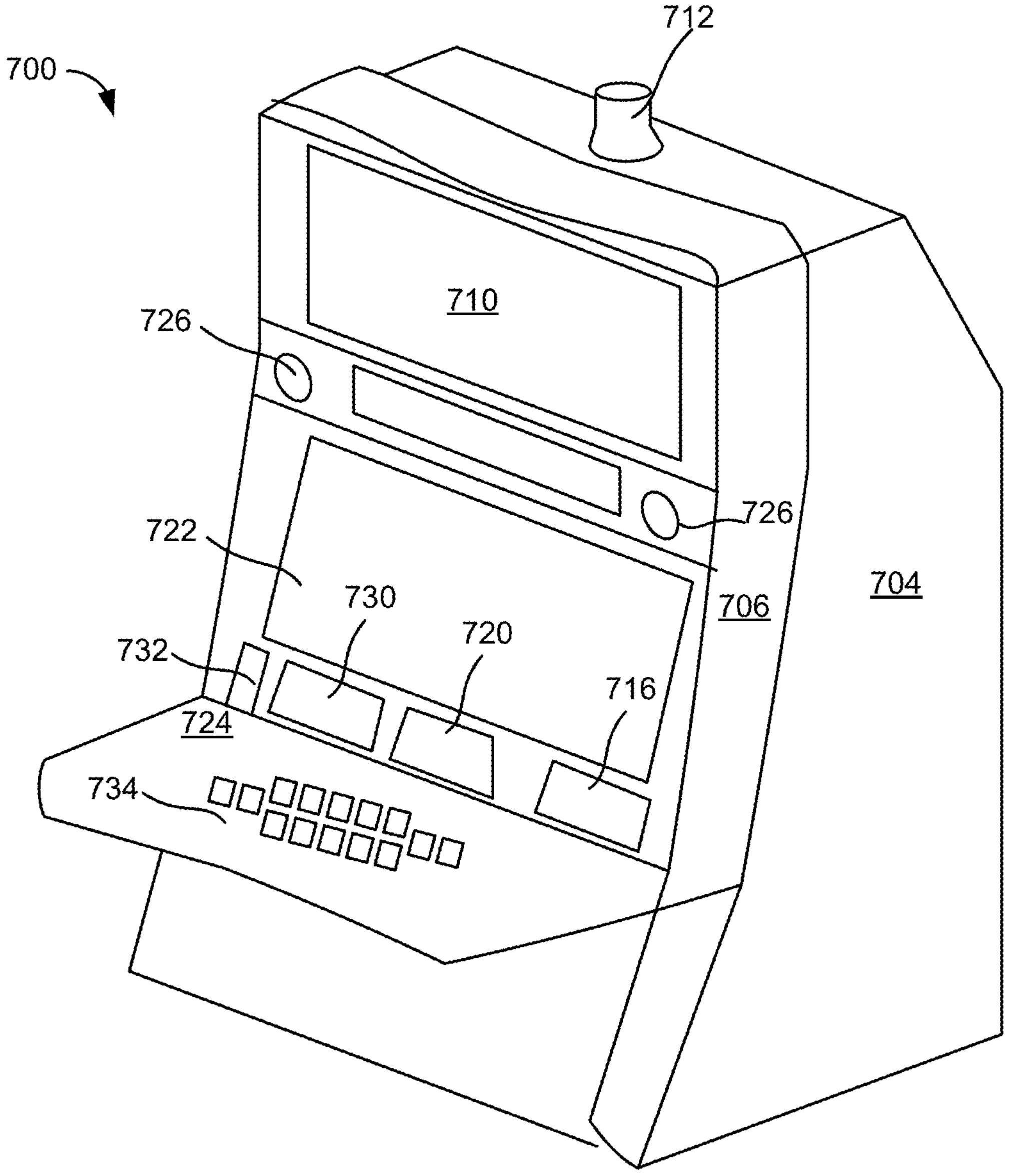
FIG. 7 is a perspective drawing of an electronic gaming machine.

As previously indicated, the conversion arrangement of FIGS. 1-6 may be used in connection with electronic gaming machines in a bricks and mortar casino and/or may be used in an online environment. FIG. 7 shows an example electronic gaming machine. A gaming machine 700 may include a main cabinet 704. The main cabinet 404 may provide a secure enclosure that prevents tampering with device components, such as a game controller (not shown) located within the interior of the main cabinet 704. The main cabinet 704 may include an access mechanism, such as a door 706, which allows the interior of the gaming machine 700 to be accessed. Actuation of the door 706 may be controlled by a locking mechanism. In some embodiments, the locking mechanism, the door 706, and the interior of main cabinet 704 may be monitored with security sensors of various types to detect whether the interior has been accessed. For instance, a light sensor may be provided within the main cabinet 704 to detect a change in light-levels when the door 706 is opened and/or an accelerometer may be attached to the door 706 to detect when the door 706 is opened.

The gaming machine 700 may include any number of user interface devices that convey sensory information to a user and/or receive input from the user. For example, the gaming machine 700 may include electronic displays 740 and/or 722, speakers 726, and/or a candle device 712 to convey information to the user of the gaming machine 700. The gaming machine 700 may also include a console 724 having one or more inputs (e.g., buttons, track pads, etc.) configured to receive input from a user. In one embodiment, the display 710 and/or the display 722 may be a touch screen display configured to receive input from a user. A controller (not shown) within the gaming machine 700 may run a game, such as a wager-based game (e.g., a keno game), in response to receiving input from a user via inputs located in the console 724, display 722, or display 710. For example, inputs located in the console 724 may be operated to place a wager in the game and to run the game. In response, the controller may cause the display 722 to show a wager-based game such as a keno game, slot machine game, video poker, etc.

The gaming machine 700 may also include devices for conducting a wager-based game. For example, the gaming machine 700 may include a ticket acceptor 716 and a printer 720. In various embodiments, the gaming machine 700 may be configured to run on credits that may be redeemed for money and/or other forms of prizes. The ticket acceptor 716 may read an inserted ticket having one or more credits usable to play a game on the gaming machine 700. For example, a player of the gaming machine 700 may wager one or more credits within a video keno game, slot machine game, video poker, or another game. If the player loses, the wagered amount may be deducted from the player's remaining balance on the gaming machine 700. However, if the player wins and is awarded an award, the player's balance may be increased by the amount won and/or awarded. Any remaining credit balance on the gaming machine 700 may be converted into a ticket via the printer 720. For example, a player of the gaming machine 700 may cash out of the machine by selecting to print a ticket via the printer 720. The ticket may then be used to play other gaming machines or redeemed for cash and/or prizes. According to various embodiments, the gaming machine 700 may record data regarding its receipt and/or disbursement of credits.

In one embodiment, the gaming machine 700 may include a loyalty card acceptor 730. In general, a loyalty card may be tied to the user's player account. A player account may store various information about the user, such as the user's identity, the user's gaming preferences, the user's gaming habits (e.g., which games the user plays, how long the user plays, etc.), or similar information about the user.

In other embodiments, the player may request that awards earned in one or more games get converted into virtual currency. In these embodiments, a total amount of virtual currency accumulated by the player through playing the first game and one or more additional games may be tracked by the virtual currency management module 114 or another module, system or device. The total amount of virtual currency reflecting the conversion of the game awards into virtual currency may be displayed to the player. In some embodiments, the actual number of points of virtual currency is hidden from the player, and instead a visual representation of the accumulated virtual currency is displayed to the user.

The first game and the one or more additional games (e.g., five other games) may be played by the player on the same user device or on multiple user devices. For example, the player may play the first game on a first gaming machine at a first casino, the second game on a second gaming machine at a second casino, and three remaining games may be played online using a user device.

Implementations of the subject matter and the operations described in this specification can be implemented in digital electronic circuitry, computer software, firmware or hardware, including the structures disclosed in this specification and their structural equivalents or in combinations of one or more of them. Implementations of the subject matter described in this specification can be implemented as one or more computer programs, i.e., one or more modules of computer program instructions, encoded on one or more computer storage medium for execution by, or to control the operation of data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus on data stored on one or more computer-readable storage devices or received from other sources.

The term "client or "server" includes a variety of apparatuses, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, a code that creates an execution environment for the computer program in question, e.g., a code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, or a portable storage device (e.g., a universal serial bus (USB) flash drive). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well. For example, feedback provided to the user can be any form of sensory feedback, e.g., visual feedback, auditory feedback, or tactile feedback and input from the user can be received in any form, including acoustic, speech, or tactile input. In addition, a computer can interact with a user by sending documents to and receiving documents from a device that is used by the user. For example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown, in sequential order or that all illustrated operations be performed to achieve desirable results. In certain circumstances, multitasking and parallel processing may be advantageous. Moreover, the separation of various system components in the implementations described above should not be understood as requiring such separation in all implementations and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method of operating a gaming system, the method comprising:

(a) receiving, over a network, a request to convert a first award earned by a player during a play of a first wager-based game into at least one award in a second wager-based game, wherein the first wager-based game is played at an electronic gaming machine including an acceptor, a cashout device, at least one display device, and at least one memory device which stores a plurality of instructions, which when executed by at least one processor, cause the at least one processor to establish a credit balance based, at least in part, on a monetary value associated with a physical item received via the acceptor, display the play of the first wager-based game, and cause an initiation of any payout associated with the credit balance if a cashout input is received via the cashout device;

(b) converting, by at least one controller, the first award earned during play of the first wager-based game to at least one award associated with the second wager-based game based on award conversion data, said award conversion data being at least partially based on a paytable of at least one of the first wager-based game and the second wager-based game; and (c) storing, by the at least one controller, data associated with result of the conversion of the first award into the at least award of the second wager-based game in a data storage system.

2. The method of claim 1, which includes receiving a request to convert the at least one award into an amount of a virtual currency.

3. The method of claim 1, wherein the first wager-based game and the second wager-based game are different games.

4. The method of claim 2, which includes:

determining a first amount of virtual currency that the at least one award is worth using the award conversion data;

converting the at least one award into the first amount of virtual currency; and updating a total amount of virtual currency associated with the player with the first amount of virtual currency.

5. The method of claim 1, wherein the award conversion data specifies, for each award, a first award virtual currency amount that the award is worth when the award is converted into virtual currency.

6. The method of claim 5, wherein the award conversion data specifies for each award, a second conversion virtual currency amount necessary for purchasing the award with virtual currency.

7. The method of claim 1, wherein the player plays the first wager-based game in a first gaming environment and the second wager-based game in a second gaming environment.

8. An electronic gaming device comprising:

a display device;

an acceptor;

a cashout device;

a user-input panel; and a game controller having at least one data processor and at least one storage device storing instructions that, when executed by the at least one data processors, cause the at least one data processor to:

(a) if a physical item is received via the acceptor, establish a credit balance based, at least in part, on a monetary value associated with the received physical item;

(b) receive player account login information from a user interface, wherein the player account login information is associated with a player;

(c) authenticate the player account login information;

(d) display a first wager-based game including one or more awards earned by the player in other games;

(e) receive a request from the player to convert a second award previously earned by the player during play of a second wager-based game into a first award in the first wager-based game;

(f) transmit the request to convert the second wager-based game award to a player management system;

(g) receive data associated with result of the requested award conversion from the player management system; and (h) if a cashout input is received via the cashout device, cause an initiation of any payout associated with the credit balance.

9. The electronic gaming device of claim 8, wherein a total amount of virtual currency associated with the player is displayed during play of the first wager-based game.

10. The electronic gaming device of claim 9, wherein the player played the first wager-based game in a first gaming environment, and wherein the player played the at least one game in a second gaming environment.

11. The electronic gaming device of claim 10, wherein the first gaming environment is a first casino.

12. The electronic gaming device of claim 11, wherein the second gaming environment is a second casino.

13. The electronic gaming device of claim 11, further comprising displaying a first wager-based game visual representation of virtual currency associated with a player account of the player.

14. A computer-readable storage medium having machine instructions stored therein, the instructions being executable by a processor to cause the processor to:

(a) receive, over a network, a request to convert a first award earned by a player during a play of a first wager-based game into at least one award in a second wager-based game, wherein the first wager-based game is played at an electronic gaming machine including an acceptor, a cashout device, at least one display device, and at least one memory device which stores a plurality of instructions, which when executed by at least one processor, cause the at least one processor to establish a credit balance based, at least in part, on a monetary value associated with a physical item received via the acceptor, display the play of the first wager-based game, and cause an initiation of any payout associated with the credit balance if a cashout input is received via the cashout device;

(b) convert the first award earned during play of the first wager-based game to at least one award associated with the second wager-based game based on award conversion data, said award conversion data being at least partially based on a paytable of at least one of the first wager-based game and the second wager-based game; and (c) store data associated with result of the conversion of the first award into the at least award of the second wager-based game in a data storage system.

15. The computer-readable storage medium of claim 14, wherein the instructions are executable by the processor to cause the processor to receive a request to convert the at least one award into an amount of virtual currency.

16. The computer-readable storage medium of claim 15, wherein the first wager-based game and the second wager-based game are different games.

17. The computer-readable storage medium of claim 15, wherein the instructions are executable by the processor to cause the processor to determine a first amount of virtual currency that the at least one award is worth using the award conversion data;

convert the at least one award into the first amount of virtual currency; and updating a total amount of virtual currency associated with the player with the first amount of virtual currency.

18. The computer-readable storage medium of claim 14, wherein the award conversion data specifies, for each award, a first award virtual currency amount that the award is worth when the award is converted into virtual currency.

19. The computer-readable storage medium of claim 14, wherein the award conversion data specifies for each award, a second conversion virtual currency amount necessary for purchasing the award with virtual currency.

20. The computer-readable storage medium of claim 15, wherein the player plays the first wager-based game in a first gaming environment and the second wager-based game in a second gaming environment.

* * * * *